(12) United States Patent
Aoki

(10) Patent No.: US 9,933,693 B2
(45) Date of Patent: Apr. 3, 2018

(54) OPTICAL DEVICE, LIGHT SOURCE DEVICE, AND PROJECTOR

(71) Applicant: Seiko Epson Corporation, Tokyo (JP)

(72) Inventor: Shigekazu Aoki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/382,840

(22) Filed: Dec. 19, 2016

(65) Prior Publication Data

US 2017/0205692 A1   Jul. 20, 2017

(30) Foreign Application Priority Data

Jan. 20, 2016  (JP) .................................. 2016-008518
Oct. 27, 2016  (JP) .................................. 2016-210304

(51) Int. Cl.
| | | |
|---|---|---|
| *G03B 21/16* | (2006.01) | |
| *G02B 7/00* | (2006.01) | |
| *F21V 29/505* | (2015.01) | |
| *G03B 21/20* | (2006.01) | |
| *F21V 29/74* | (2015.01) | |
| *G03B 33/12* | (2006.01) | |

(52) U.S. Cl.
CPC ............ *G03B 21/16* (2013.01); *F21V 29/505* (2015.01); *F21V 29/745* (2015.01); *G02B 7/008* (2013.01); *G03B 21/2066* (2013.01); *G03B 21/208* (2013.01); *G03B 21/2073* (2013.01); *G03B 33/12* (2013.01)

(58) Field of Classification Search
CPC ... G03B 21/14; G03B 21/16; H01L 2023/405; H01L 2023/4062
See application file for complete search history.

(56) References Cited

U.S. PATENT DOCUMENTS

| | | | | |
|---|---|---|---|---|
| 4,128,363 A | * | 12/1978 | Fujikake | ................. F01D 5/145 |
| | | | | 416/175 |
| 4,854,374 A | * | 8/1989 | Harrison | ............... F24F 5/0017 |
| | | | | 165/47 |
| 9,004,701 B2 | * | 4/2015 | Berben | ................... A61B 18/22 |
| | | | | 353/31 |
| 2003/0131970 A1 | * | 7/2003 | Carter | ..................... B21C 23/10 |
| | | | | 165/80.3 |
| 2008/0174952 A1 | * | 7/2008 | Ye | ....................... H01L 23/4006 |
| | | | | 361/679.48 |
| 2008/0223558 A1 | * | 9/2008 | Otsuki | ................... F04D 29/582 |
| | | | | 165/121 |
| 2009/0153805 A1 | * | 6/2009 | Li | ........................... G03B 21/16 |
| | | | | 353/57 |
| 2010/0097766 A1 | * | 4/2010 | Wu | ..................... H01L 23/4006 |
| | | | | 361/700 |

(Continued)

FOREIGN PATENT DOCUMENTS

| | | |
|---|---|---|
| JP | 2012-13897 A | 1/2012 |
| JP | 2014-123014 A | 7/2014 |

*Primary Examiner* — Sultan Chowdhury
(74) *Attorney, Agent, or Firm* — ALG Intellectual Property, LLC

(57) ABSTRACT

An optical device includes a reflector and a rotation member that dissipates the heat of the reflector. The rotation member includes a base portion placed on the reflector and a plurality of blade portions that project to the side opposite to the base portion. The plurality of blade portions each include an inclined portion that is inclined with respect to the base portion.

16 Claims, 9 Drawing Sheets

(56) References Cited

U.S. PATENT DOCUMENTS

2012/0320355 A1* 12/2012 Maeda ............... G03B 21/2013
                                                            355/67
2014/0176915 A1   6/2014 Yamamoto

* cited by examiner

OPTICAL DEVICE, LIGHT SOURCE DEVICE, AND PROJECTOR

CROSS-REFERENCE TO RELATED APPLICATION

The entire disclosure of Japanese Patent Application No. 2016-008518 filed Jan. 20, 2016 and No. 2016-210304 filed Oct. 27, 2016 are expressly incorporated by reference herein.

BACKGROUND

1. Technical Field

The present invention relates to an optical device, a light source device, and a projector.

2. Related Art

In the related art, a projector that modulates, in response to image information, light emitted from a light source and projects an image onto a projection surface such as a screen has been known. An optical element in the projector generates heat with the light from the light source, and therefore, a technique for cooling this optical element has been proposed (see, for example, JP-A-2014-123014 and JP-A-2012-13897).

JP-A-2014-123014 discloses a light source device including an excitation light source portion that emits excitation light and a fluorescence emitting portion. The fluorescence emitting portion includes a phosphor plate including a phosphor layer, a substrate on which the phosphor plate is placed, and a heat sink. The phosphor plate is irradiated with the excitation light emitted from the excitation light source portion and emits fluorescence in a wavelength band different from that of the excitation light. The heat sink includes a plurality of fins and dissipates the heat of the substrate (optical element) on which the phosphor plate is placed.

JP-A-2012-13897 discloses a light source device including a semiconductor laser, a dichroic mirror, a reflective color wheel, a rotation mechanism, and fins that function as a heat dissipating portion of the reflective color wheel. The fins are formed so as to be rotated by the rotation mechanism and diffuse the air with centrifugal force.

However, in the technique disclosed in JP-A-2014-123014, the fins of the heat sink extend long to the side opposite to the phosphor plate, causing a problem of increasing the size of the device.

Moreover, in the fins disclosed in JP-A-2012-13897, it is difficult to sufficiently use a flow of air generated by rotation, and it is conceivable that the number of revolutions of the fins will increase or that the size of the fin will increase. An increased number of revolutions of the fins leads to a problem of increasing noise due to wind noise, and an increased size of the fin leads to a problem of increasing the size or weight of the light source device.

SUMMARY

An advantage of some aspects of the invention is to solve at least a part of the problems described above, and the invention can be implemented as the following forms or application examples.

Application Example 1

An optical device according to this application example includes: an optical element; and a heat dissipating portion that dissipates heat of the optical element, wherein the heat dissipating portion includes a base portion placed on the optical element, and a plurality of blade portions that project from the base portion to the side opposite to the optical element, and the plurality of blade portions each include an inclined portion that is inclined with respect to the base portion.

According to this configuration, the heat dissipating portion can dissipate the heat of the optical element generated by light incident thereon, from the blade portion through the base portion. Moreover, the blade portion includes the inclined portion inclined with respect to the base portion. With this configuration, the heat dissipating portion downsized in a direction vertical to the base portion and having a large surface area can be made as compared with a configuration including an erected portion that is erected vertically to the base portion. Therefore, it is possible to provide the optical device in which the heat of the optical element is efficiently dissipated while an increase in size is suppressed.

Application Example 2

In the optical device according to the application example, it is preferable that the heat dissipating portion is integrally formed of a sheet metal.

According to this configuration, the heat dissipating portion can be formed by press working or the like. Therefore, as compared with, for example, the formation of the heat dissipating portion by molding from molten metal or the formation of the heat dissipating portion by cutting out from amass of metal, the heat dissipating portion can be more simply manufactured. Moreover, as compared with the processing by molding of metal or cutting out from metal, the thicknesses of the base portion and the inclined portion can be formed thin; therefore, the weight of the heat dissipating portion and thus the weight of the optical device can be reduced.

Application Example 3

In the optical device according to the application example, it is preferable that an opening is formed in the blade portion.

According to this configuration, since the surface area of the blade portion can be formed large, the heat dissipating function of the heat dissipating portion can be enhanced.

Application Example 4

In the optical device according to the application example, it is preferable that the blade portion is provided with a convex portion.

According to this configuration, since the surface area of the blade portion can be formed large, the heat dissipating function of the heat dissipating portion can be enhanced.

Application Example 5

A light source device according to this application example includes: a light source; the optical device according to the above, on which light emitted from the light source is incident; and a rotation device that rotates the optical device, wherein the heat dissipating portion is a rotation member that rotates together with the optical element, the base portion surrounds a central axis of rotation of the rotation member, the plurality of blade portions project from the base portion to the outside in a radial direction about the central axis of rotation, and the inclined portion is inclined with respect to the optical element so as to come closer to the side of the optical element from the outside to the inside in the radial direction about the central axis of rotation.

According to this configuration, since the light source device includes the rotation device and the rotation member as the heat dissipating portion both described above, a flow of air generated by the rotation of the rotation member can be directed to the optical element by the blade portions. Therefore, the flow of air generated by the rotation of the rotation member can be effectively used to efficiently cool the optical element. Hence, it is possible to provide the light source device capable of suppressing the deterioration of the optical element and thus extending a life span.

Moreover, when the rotation member is integrally formed of a sheet metal, the weight of the rotation member can be further reduced. Therefore, a rotation device of low power, that is, a rotation device of small size or low power consumption, can be employed.

Application Example 6

In the light source device according to the application example, it is preferable that the inclined portion includes, on the back side thereof in a rotational direction of the rotation member, an inclined projecting portion that projects in a direction opposite to the rotational direction.

According to this configuration, since the inclined portion includes the inclined projecting portion described above, a greater flow of air can be directed to the optical element by the rotation of the rotation member. Therefore, the optical element can be further efficiently cooled.

Application Example 7

In the light source device according to the application example, it is preferable that the blade portion includes a bent portion that is bent from an edge of the inclined projecting portion so as to face the optical element.

According to this configuration, since the bent portion is formed at the tip of the inclined projecting portion, it is possible to smooth a flow of air associated with the rotation of the rotation member and reduce wind noise of the blade portion. Therefore, it is possible to efficiently cool the optical element and rotate the rotation member with suppressed noise.

Application Example 8

A projector according to this application example includes: the light source device according to the above; a light modulator that modulates light emitted from the light source device; and a projection optical device that projects the light modulated by the light modulator.

According to this configuration, since the projector includes the light source device described above, the projector can maintain the optical performance of the optical element and project an image having favorable image quality with high luminance over a long period of time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projector according to an embodiment will be described with reference to the drawings.

Schematic Configuration of Projector

Figure 1:
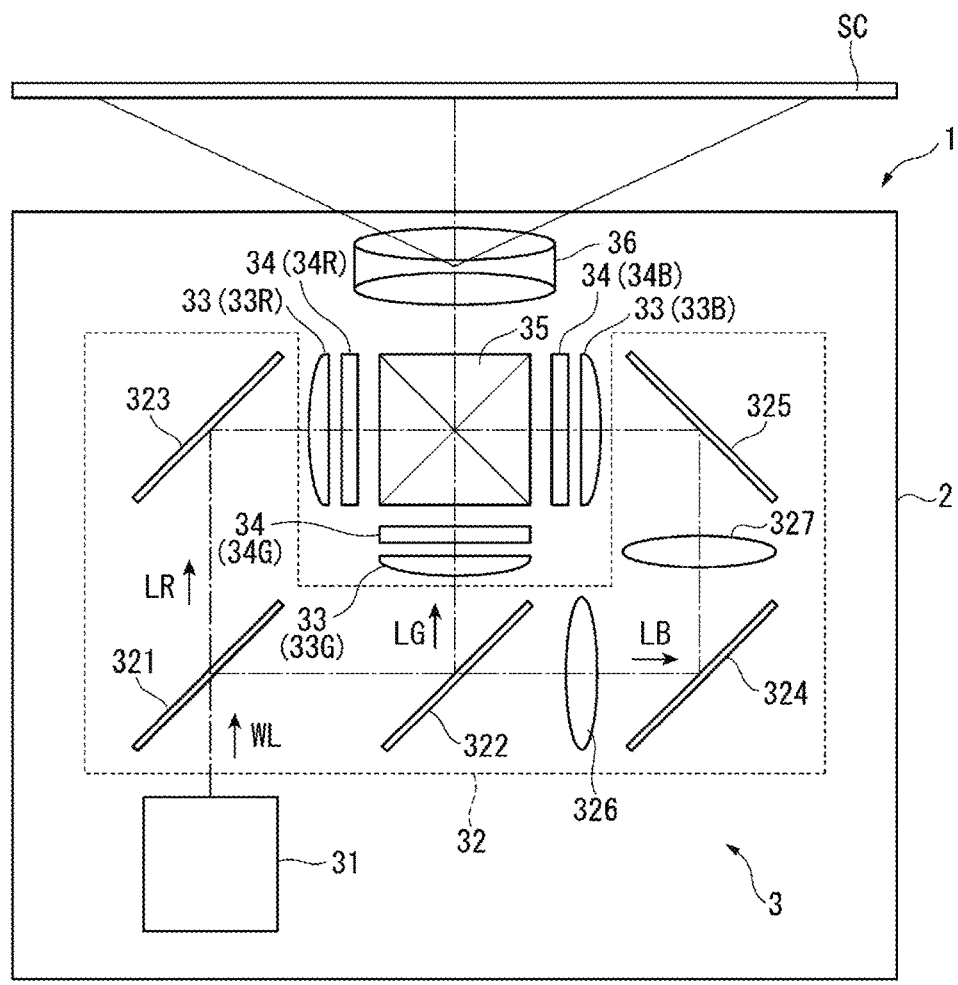
FIG. 1 is a schematic view showing the configuration of a projector according to an embodiment.

FIG. 1 is a schematic view showing the configuration of the projector 1 according to the embodiment.

The projector 1 according to the embodiment is a display device that modulates light emitted from an illumination device 31 provided within the projector 1 to form an image in response to image information and projects the image in an enlarged manner onto a screen SC as a projection surface.

As shown in FIG. 1, the projector 1 includes an external housing 2 and an optical unit 3 accommodated in the external housing 2. In addition, although not shown in the drawing, the projector 1 includes a controller that controls the projector 1, a cooling device that cools objects to be cooled, such as optical components, and a power supply device that supplies power to electronic components.

Configuration of Optical Unit

The optical unit 3 includes the illumination device 31, a color separating device 32, collimating lenses 33, light modulators 34, a color combining device 35, and a projection optical device 36.

The illumination device 31 emits illumination light WL. The configuration of the illumination device 31 will be described in detail later.

The color separating device 32 separates the illumination light WL emitted from the illumination device 31 into red light LR, green light LG, and blue light LB. The color separating device 32 includes dichroic mirrors 321 and 322, reflection mirrors 323, 324, and 325, and relay lenses 326 and 327.

The dichroic mirror 321 separates the illumination light WL into the red light LR and the other color light (the green light LG and the blue light LB). The red light LR separated is reflected by the reflection mirror 323 and directed to the collimating lens 33 (33R). The other color light separated is incident on the dichroic mirror 322.

The dichroic mirror 322 separates the other color light into the green light LG and the blue light LB. The green light LG separated is directed to the collimating lens 33 (33G). The blue light LB separated is directed to the collimating lens 33 (33B) through the relay lens 326, the reflection mirror 324, the relay lens 327, and the reflection mirror 325.

The collimating lenses 33 (the collimating lenses for the respective color lights LR, LG, and LB of red, green, and blue are respectively indicated by 33R, 33G, and 33B) collimate incident light.

The light modulators 34 (the light modulators for the respective color lights LR, LG, and LB of red, green, and blue are respectively indicated by 34R, 34G, and 34B) modulate the color lights LR, LG, and LB incident thereon to form image lights in response to image information. The light modulators 34 are each configured to include a liquid crystal panel that modulates incident color light and a pair of polarizers disposed on the light incident and exiting sides of the liquid crystal panel. A region to be illuminated by the illumination device 31 to be described later is set in an image forming region (modulation region) where the incident color light is modulated to form an image in the light modulator 34.

The color combining device 35 combines the image lights (the image lights respectively formed of the color lights LR, LG, and LB) emitted from the light modulators 34R, 34G, and 34B. The color combining device 35 can be formed of, for example, a cross dichroic prism, but may be formed of a plurality of dichroic mirrors.

The projection optical device 36 projects the image light combined by the color combining device 35 onto the screen SC. Although not shown in the drawing, a coupling lens including a plurality of lenses disposed in a lens barrel can be employed as the projection optical device.

An enlarged image is projected on the screen SC by the optical unit 3.

Configuration of Illumination Device

Figure 2:
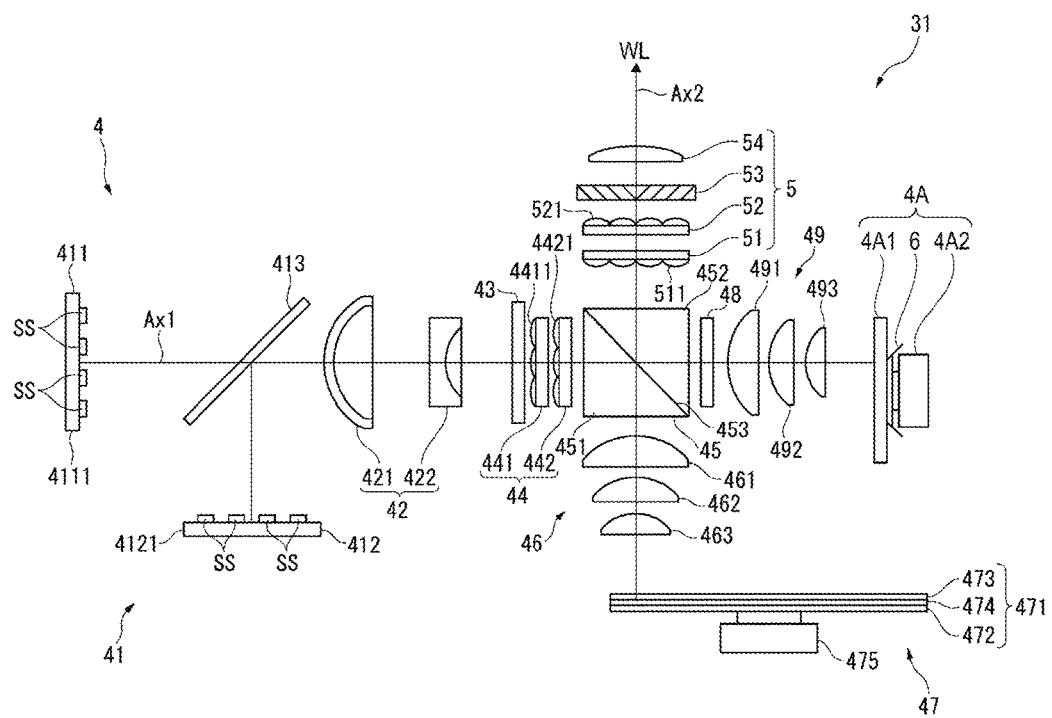
FIG. 2 is a schematic view showing the configuration of an illumination device of the embodiment.

FIG. 2 is a schematic view showing the configuration of the illumination device 31.

The illumination device 31 emits the illumination light WL toward the color separating device 32 as described above. As shown in FIG. 2, the illumination device 31 includes a light source device 4 and a homogenizing device 5.

Configuration of Light Source Device

The light source device 4 emits a luminous flux to the homogenizing device 5. The light source device 4 includes a light source portion 41, an afocal optical system 42, a first retardation element 43, a homogenizer optical system 44, a light separating element 45, a first condensing system 46, a wavelength conversion device 47, a second retardation element 48, a second condensing system 49, and a diffusing device 4A as an optical device.

The light source portion 41, the afocal optical system 42, the first retardation element 43, the homogenizer optical system 44, the light separating element 45, the second retardation element 48, the second condensing system 49, and the diffusing device 4A are disposed on a first illumination optical axis Ax1 set in the light source device 4. The light separating element 45 is disposed at the crossing portion of the first illumination optical axis Ax1 and a second illumination optical axis Ax2 orthogonal to the first illumination optical axis Ax1.

On the other hand, the first condensing system 46 and the wavelength conversion device 47 are disposed on the second illumination optical axis Ax2.

Configuration of Light Source Portion

The light source portion 41 emits excitation light, which is blue light, toward the afocal optical system 42. The light source portion 41 includes a first light source portion 411, a second light source portion 412, and a light combining member 413.

The first light source portion 411 includes a solid-state light source array 4111 in which a plurality of solid-state light sources SS (light sources) that are laser diodes (LDs) are arranged in a matrix, and a plurality of collimating lenses (not shown) corresponding to the solid-state light sources SS. Similarly, the second light source portion 412 includes a solid-state light source array 4121 in which a plurality of solid-state light sources SS are arranged in a matrix, and a plurality of collimating lenses (not shown) corresponding to the solid-state light sources SS. These solid-state light sources SS emit light having a peak wavelength in, for example, a wavelength range of from 440 nm to 460 nm. The excitation light emitted from each of the solid-state light sources SS is collimated by the collimating lens and emitted to the light combining member 413. In the embodiment, the excitation light emitted from each of the solid-state light sources SS is S-polarized light.

The light combining member 413 transmits the excitation light that is emitted from the first light source portion 411 along the first illumination optical axis Ax1, and reflects the excitation light that is emitted from the second light source portion 412 along a direction orthogonal to the first illumination optical axis Ax1 so as to be along the first illumination optical axis Ax1, thereby combining the excitation lights. Although not shown in detail in the drawing, the light combining member 413 is formed as a plate-like body, in which a plurality of transmitting portions that are disposed at the incident positions of the excitation lights emitted from the first light source portion 411 and transmit the excitation lights, and a plurality of reflecting portions that are disposed at the incident positions of the excitation lights emitted from the second light source portion 412 and reflect the excitation lights, are alternately arranged. The excitation light transmitted through the light combining member 413 is emitted to the afocal optical system 42.

Configuration of Afocal Optical System

The afocal optical system 42 adjusts the luminous flux diameter of the excitation light emitted from the light source portion 41. Specifically, the afocal optical system 42 is an optical system that concentrates the excitation light emitted as parallel light from the light source portion 41 and reduces the luminous flux diameter, further collimates the excitation light, and emits the collimated excitation light. The afocal optical system 42 is configured to include lenses 421 and 422 that are respectively a convex lens and a concave lens. The excitation light emitted from the light source portion 41 is concentrated by the afocal optical system 42 and emitted to the first retardation element 43.

Configuration of First Retardation Element

The first retardation element 43 is a half-wave plate. By passing through the first retardation element 43, the excitation light that is S-polarized light emitted from the afocal optical system 42 is converted, through partial conversion of the S-polarized light to P-polarized light, to mixed light of S-polarized light and P-polarized light. The excitation light transmitted through the first retardation element 43 is incident on the homogenizer optical system 44.

In the embodiment, the first retardation element 43 is configured to be rotatable about the optical axis (coincident with the first illumination optical axis Ax1) of the first retardation element 43. With the rotation of the first retardation element 43, the ratio between the S-polarized light and P-polarized light of the excitation light that passes through the first retardation element 43 can be adjusted according to the amount of rotational movement (the angle of rotational movement) of the first retardation element 43.

Configuration of Homogenizer Optical System

The homogenizer optical system 44 homogenizes the illuminance distribution of excitation light to be incident on a phosphor layer 473 that is a region to be illuminated in the wavelength conversion device 47 to be described later. The homogenizer optical system 44 includes a first multi-lens 441 and a second multi-lens 442.

The first multi-lens 441 has a configuration in which a plurality of first lenses 4411 are arranged in a matrix in a plane orthogonal to the first illumination optical axis Ax1. The first multi-lens 441 divides incident excitation light into a plurality of partial luminous fluxes (excitation partial luminous fluxes) with the plurality of first lenses 4411.

The second multi-lens 442 has a configuration in which a plurality of second lenses 4421 corresponding to the plurality of first lenses 4411 are arranged in a matrix in a plane orthogonal to the first illumination optical axis Ax1. The second multi-lens 442 superimposes, in cooperation with the second lenses 4421 and the first condensing system 46, the plurality of excitation partial luminous fluxes divided by the first lenses 4411 on the phosphor layer 473 that is the region to be illuminated. With this configuration, the illuminance in a plane (in a plane orthogonal to the second illumination optical axis Ax1) orthogonal to the central axis of the excitation light to be incident on the phosphor layer 473 is homogenized.

The excitation light transmitted through the homogenizer optical system 44 is incident on the light separating element 45.

The multi-lenses 441 and 442 constituting the homogenizer optical system 44 are configured to be movable along a plane orthogonal to the first illumination optical axis Ax1. With the movement of the multi-lenses 441 and 442, the traveling direction of the excitation light emitted from the homogenizer optical system 44 is adjusted. The multi-lenses 441 and 442 do not have to be movable independently of each other, and the multi-lenses 441 and 442 may be simultaneously movable.

Configuration of Light Separating Element

The light separating element 45 is a prismatic polarizing beam splitter (PBS), in which prisms 451 and 452 each formed in a substantially triangular prismatic shape are bonded together at the interface and thus formed in a substantially rectangular parallelepiped shape as a whole. The interface between the prisms 451 and 452 is inclined approximately 45° with respect to each of the first illumination optical axis Ax1 and the second illumination optical axis Ax2. A polarization separation layer 453 having wavelength selectivity is formed at the interface of the prism 451 located on the side of the homogenizer optical system 44 (i.e., the side of the light source portion 41) in the light separating element 45.

The polarization separation layer 453 has the characteristic of separating S-polarized light (first excitation light) and P-polarized light (second excitation light) that are included in the excitation light, and has the characteristic of transmitting fluorescent light that is produced by irradiation of the wavelength conversion device to be described later with the excitation light, irrespective of the polarization state of the fluorescent light. That is, the polarization separation layer 453 has a wavelength-selective polarization separation characteristic, in which the polarization separation layer 453 separates S-polarized light and P-polarized light with respect to light in a predetermined wavelength range but transmits S-polarized light and P-polarized light with respect to light in other predetermined wavelength ranges.

With the light separating element 45, P-polarized light of excitation light that is emitted from the homogenizer optical system 44 is transmitted along the first illumination optical axis Ax1 to the side of the second retardation element 48, while S-polarized light is reflected along the second illumination optical axis Ax1 to the side of the first condensing system 46. That is, the light separating element 45 allows the P-polarized light of the excitation light to be emitted toward the second retardation element 48 (and thus the diffusing device 4A), and allows the S-polarized light to be emitted toward the first condensing system 46.

Configuration of First Condensing System

The excitation light of the S-polarized light, which is transmitted through the homogenizer optical system 44 and reflected by the polarization separation layer 453, is incident on the first condensing system 46. The first condensing system 46 concentrates (converges) the excitation light onto a wavelength conversion element 471, and in addition, the first condensing system 46 concentrates and collimates fluorescent light that is emitted from the wavelength conversion element 471, and emits the fluorescent light toward the polarization separation layer 453. The first condensing system 46 is formed of three pickup lenses 461 to 463. The number of lenses that constitute the first condensing system 46 is not limited to three.

Configuration of Wavelength Conversion Device

The wavelength conversion device 47 converts incident excitation light to fluorescent light. The wavelength conversion device 47 includes the wavelength conversion element 471 and a rotation device 475.

The rotation device 475 is formed of a motor or the like that rotates the wavelength conversion element 471 formed in a flat-plate shape.

The wavelength conversion element 471 includes a substrate 472, the phosphor layer 473, and a reflection layer 474. The phosphor layer 473 and the reflection layer 474 are located on a surface of the substrate 472 on the excitation light-incident side.

The substrate 472 is formed in a substantially circular shape as viewed from the excitation light-incident side. The substrate 472 can be formed of metal, ceramics, or the like.

The phosphor layer 473 contains a phosphor that emits fluorescent light (yellow light including green light and red light; fluorescent light having a peak wavelength in a wavelength range of, for example, from 500 to 700 nm), which is unpolarized light, through excitation by incident excitation light. Portion of the fluorescent light produced in the phosphor layer 473 is emitted to the side of the first condensing system 46, and another portion is emitted to the reflection layer 474.

The reflection layer 474 is disposed between the phosphor layer 473 and the substrate 472, and reflects the fluorescent light emitted from the phosphor layer 473 to the side of the first condensing system 46.

When the wavelength conversion element 471 is irradiated with excitation light, the fluorescent light described above is diffusely emitted to the side of the first condensing system 46 by the phosphor layer 473 and the reflection layer 474. Then, the fluorescent light is incident on the polarization separation layer 453 of the light separating element 45 through the first condensing system 46, passes through the polarization separation layer 453 along the second illumination optical axis Ax2, and is emitted to the homogenizing device 5. That is, the fluorescent light produced in the wavelength conversion element 471 is emitted in the direction of the second illumination optical axis Ax2 through the light separating element 45.

The wavelength conversion device 47 is configured such that at least the position of the phosphor layer 473 with respect to the first condensing system 46 is movable along the second illumination optical axis Ax2. Specifically, in the embodiment, the entire wavelength conversion device 47 is configured to be movable along the second illumination optical axis Ax2. That is, although not shown in the drawing, the wavelength conversion device 47 includes a movement mechanism that movably supports the rotation device 475 along the second illumination optical axis Ax2. With the movement of the wavelength conversion device 47 (the phosphor layer 473), the defocus position of excitation light with respect to the phosphor layer 473 can be adjusted. For this reason, the luminous flux diameter of fluorescent light that is diffusely emitted from the wavelength conversion device 47 can be adjusted, and thus the luminous flux diameter of the fluorescent light passing through the polarization separation layer 453 and traveling toward the homogenizing device 5 can be adjusted.

Configurations of Second Retardation Element, Second Condensing System, and Diffusing Device The second retardation element 48 is a quarter-wave plate, and converts the polarization state of excitation light (linearly polarized light) that is emitted from the light separating element 45 into a circularly polarized light state.

The second condensing system 49 is an optical system that concentrates (converges) the excitation light transmitted through the second retardation element 48 onto the diffusing device 4A, and is formed of three pickup lenses 491 to 493 in the embodiment. The number of lenses that constitute the second condensing system 49 is not limited to three, similarly to the first condensing system 46.

The diffusing device 4A diffusely reflects incident excitation light at a diffusion angle similar to that of the fluorescent light produced in and emitted from the wavelength conversion device 47. The diffusing device 4A includes a reflector 4A1 that reflects incident light in a Lambertian manner, a rotation member 6 that is disposed on a surface of the reflector 4A1 on the side opposite to the reflection surface thereof, and a motor 4A2 as a rotation device that rotates the reflector 4A1 and the rotation member 6. The reflector 4A1 corresponds to an optical element, and the rotation member 6 corresponds to a heat dissipating portion that dissipates the heat of the reflector 4A1 (optical element). The surface of the reflector 4A1 on the side opposite to the reflection surface is referred to as "rear surface 4A1$b$" (see FIG. 4).

The excitation light diffusely reflected by the diffusing device 4A is incident again on the second retardation element 48 through the second condensing system 49. The circularly polarized light emitted to the diffusing device 4A is converted to opposite-handed circularly polarized light when reflected by the diffusing device 4A, and is converted to excitation light of S-polarized light that is rotated by 90° with respect to the polarization of the excitation light in the course of passing through the second retardation element 48. Then, the excitation light is reflected by the polarization separation layer 453 and incident as blue light on the homogenizing device 5 along the second illumination optical axis Ax2. That is, the excitation light diffusely reflected by the diffusing device 4A is emitted in the direction of the second illumination optical axis Ax2 through the light separating element 45.

The second condensing system 49 is configured to be movable along a plane orthogonal to the first illumination optical axis Ax1. With the movement of the second condensing system 49, the incident angle of the excitation light (blue light) diffused by the diffusing device 4A with respect to the polarization separation layer 453, and thus the inclination angle of the excitation light reflected by the polarization separation layer 453 and traveling toward the homogenizing device 5 with respect to the second illumination optical axis Ax2 can be adjusted. Since the moving of the homogenizer optical system 44 changes the optical path of excitation light transmitted through the homogenizer optical system 44, the optical path of excitation light that passes through the second condensing system 49 is also changed. Because of this, the movement of the second condensing system 49 has the function of complementing the change in the optical path of blue light caused by the movement of the homogenizer optical system 44.

Moreover, in the embodiment, the diffusing device 4A is configured to be movable along the first illumination optical axis Ax1. With the movement of the diffusing device 4A, the luminous flux diameter of excitation light that is incident on the diffusing device 4A can be adjusted. Therefore, the luminous flux diameter of excitation light that is diffused by the diffusing device 4A and thus the luminous flux diameter of the excitation light reflected by the polarization separation layer 453 and traveling toward the homogenizing device 5 can be adjusted. Since the diffusing device 4A includes the motor 4A2 and the rotation member 6, the reflector 4A1 is configured so as to be efficiently cooled. The diffusing device 4A will be described in detail later.

As described above, the S-polarized light (first excitation light) of the excitation light emitted to the light separating element 45 through the homogenizer optical system 44 is converted by the wavelength conversion device 47 to yellow light including green light and red light, and thereafter, the yellow light passes through the light separating element 45 and is emitted to the homogenizing device 5. On the other hand, the P-polarized light (second excitation light) is incident on the diffusing device 4A to thereby be diffusely reflected, passes through the second retardation element 48 twice, is reflected by the light separating element 45, and emitted as blue light to the homogenizing device 5. That is, these blue light and yellow light are combined by the light separating element 45 and emitted as the white illumination light WL to the homogenizing device 5.

Configuration of Homogenizing Device

The homogenizing device 5 homogenizes the illuminance in a plane (plane orthogonal to the optical axis) orthogonal to the central axis (the second illumination optical axis Ax1) of the illumination light WL emitted from the light source device 4. Specifically, the homogenizing device 5 homogenizes the illuminance distribution of the luminous flux in the image forming region (modulation region) that is a region to be illuminated in each of the light modulators 34 (34R, 34G, and 34B). The homogenizing device 5 includes a first lens array 51, a second lens array 52, a polarization conversion element 53, and a superimposing lens 54.

The first lens array 51 has a configuration in which a plurality of small lenses 511 each of which is a small lens are arranged in a matrix in a plane orthogonal to the optical axis. The first lens array 51 divides the illumination light WL incident thereon into a plurality of partial luminous fluxes with the plurality of small lenses 511.

The second lens array 52 has a configuration in which a plurality of small lenses 521 are arranged in a matrix in a plane orthogonal to the optical axis, similarly to the first lens array 51. Each of the small lenses 521 is in one-to-one relation with the corresponding small lens 511. That is, a partial luminous flux that is emitted from the corresponding small lens 511 is incident on one small lens 521. These small lenses 521 superimpose, in cooperation with the superimposing lens 54, the plurality of partial luminous fluxes divided by the small lenses 511 on the image forming region of each of the light modulators 34.

The polarization conversion element 53 is disposed between the second lens array 52 and the superimposing lens 54, and has the function of aligning the polarization directions of the plurality of partial luminous fluxes incident on the polarization conversion element 53.

Configuration of Diffusing Device

Here, the diffusing device 4A as an optical device will be described in detail.

Figure 3:
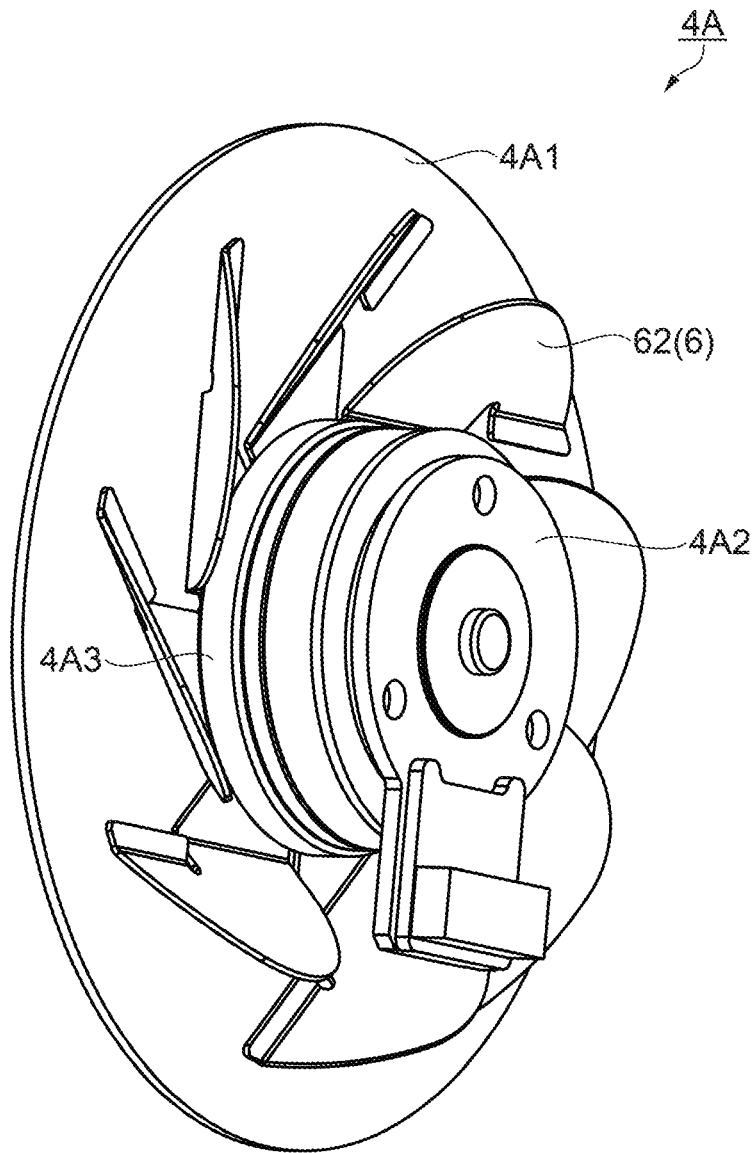
FIG. 3 is a perspective view of a diffusing device of the embodiment.
Figure 4:
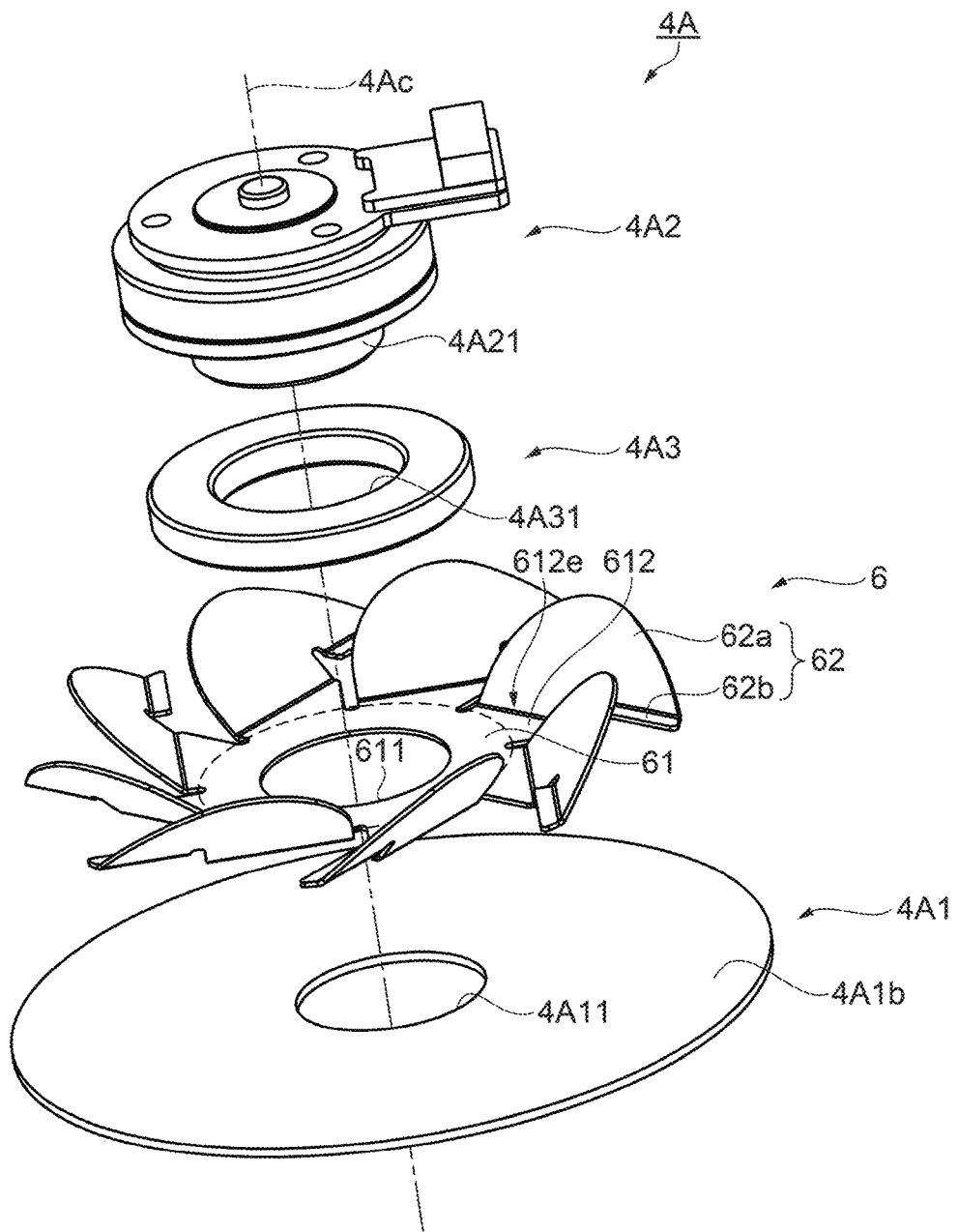
FIG. 4 is an exploded perspective view of the diffusing device of the embodiment.

FIG. 3 is a perspective view of the diffusing device 4A. FIG. 4 is an exploded perspective view of the diffusing device 4A.

As shown in FIGS. 3 and 4, the diffusing device 4A includes a spacer 4A3, in addition to the reflector 4A1 as an optical element, the motor 4A2 as a rotation device, and the rotation member 6 as a heat dissipating portion.

The reflector 4A1 is formed in a plate shape using a metal material having a high thermal conductivity (e.g., aluminum, copper, silver, or an alloy including these materials). As shown in FIG. 4, the reflector 4A1 is formed in a circular shape in a plan view, and includes a round hole 4A11 formed in the center.

As shown in FIG. 4, the motor 4A2 includes a cylindrical hub 4A21 that rotates about a central axis 4Ac of rotation. The hub 4A21 is fitted into the reflector 4A1, and the reflector 4A1 rotates together with the hub 4A21.

The rotation member 6 is integrally formed of a sheet metal thinner than the plate thickness of the reflector 4A1, by press working or the like. Examples of the material of the rotation member 6 include, for example, aluminum, copper, and silver, all having a high thermal conductivity, and an alloy including these materials.

Figure 5:
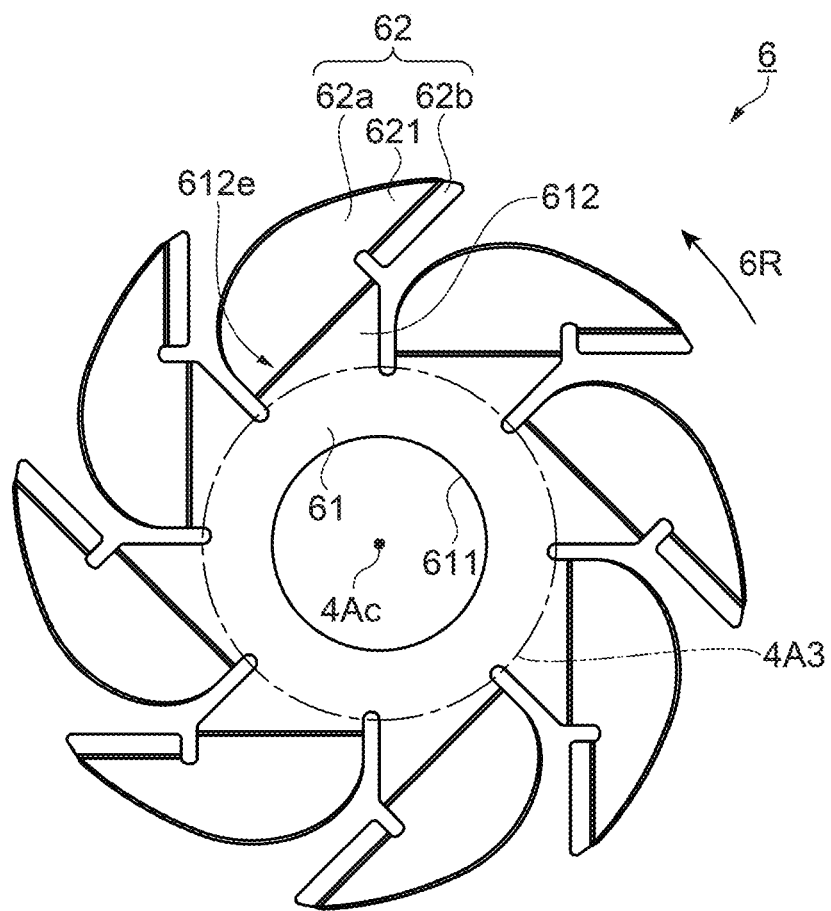
FIG. 5 is a plan view of a rotation member of the embodiment.

FIG. 5 is a plan view of the rotation member 6 as viewed from the side of the motor 4A2.

As shown in FIGS. 4 and 5, the rotation member 6 includes abase portion 61 that is formed flat, and a plurality of blade portions 62 that are bent from the base portion 61. In the drawings showing the plurality of blade portions 62, attention is paid to one blade portion of the plurality of blade portions 62, and reference numerals and signs are assigned to the blade portion.

A round hole 611 into which the hub 4A21 is fitted is formed in the center of the base portion 61, similarly to the round hole 4A11 of the reflector 4A1. In the rotation member 6 as shown in FIG. 4, the base portion 61 is placed on the rear surface 4A1*b* of the reflector 4A1, and the plurality of blade portions 62 are disposed so as to project to the side opposite to the reflector 4A1.

Moreover, the base portion 61 includes, at the outer peripheral edge, a plurality of projecting portions 612 that radially project corresponding to the number of the blade portions 62.

As shown in FIG. 4, the plurality of blade portions 62 are bent from edges 612*e* of the plurality of projecting portions 612. As shown in FIG. 5, the edge 612*e* is inclined with respect to a rotational direction 6R. Specifically, the edge 612*e* is inclined such that the front side thereof in the rotational direction 6R of the rotation member 6 is closer to the central axis 4Ac of rotation than the back side is. The rotation member 6 is formed of one sheet metal serving as the basic material, but the blade portion 62 is formed to have a sufficient surface area because the edge 612*e* is formed inclined.

As shown in FIG. 4, the spacer 4A3 includes a round hole 4A31 through which the hub 4A21 is inserted, and is stacked on the side of the base portion 61 opposite to the reflector 4A1.

The base portion 61 of the rotation member 6 is secured to the reflector 4A1 via an adhesive and interposed between the reflector 4A1 and the spacer 4A3, so that the rotation member 6 rotates together with the reflector 4A1.

Figure 6:
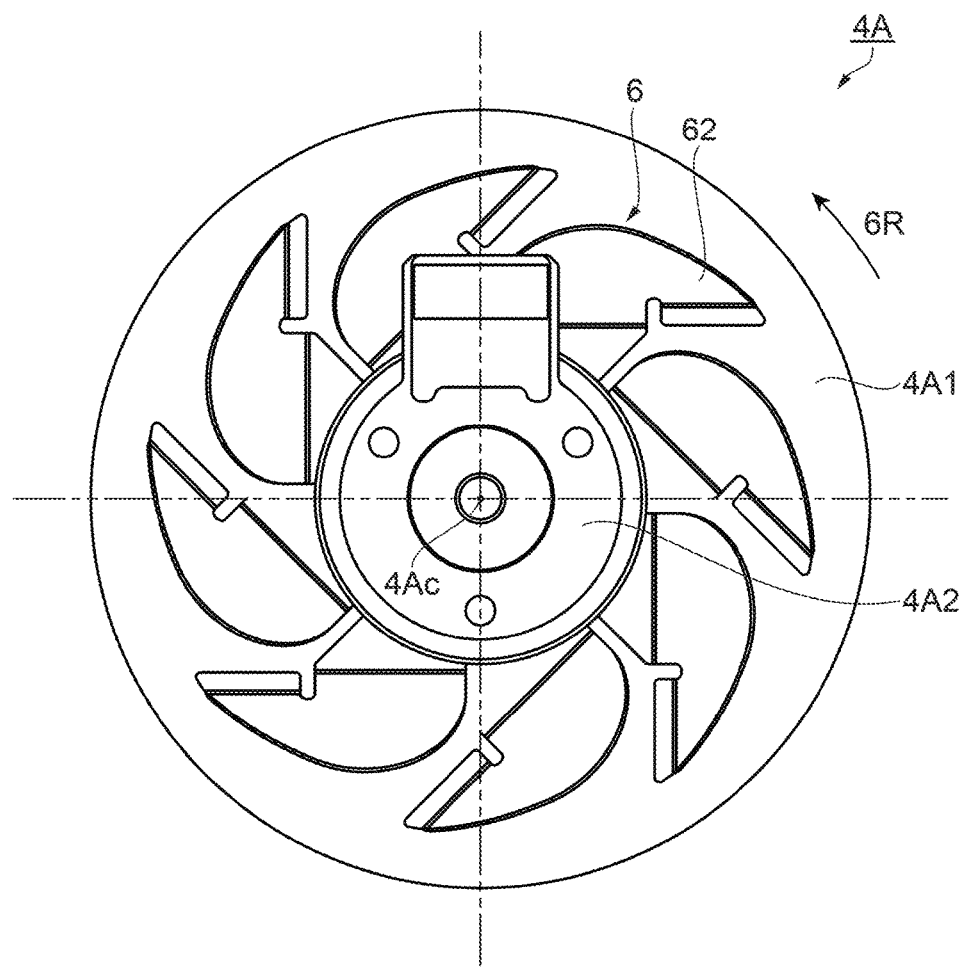
FIG. 6 is a plan view of the diffusing device of the embodiment.

FIG. 6 is a plan view of the diffusing device 4A as viewed from the side of the motor 4A2.

As shown in FIG. 6, the outside shape of the rotation member 6 is formed smaller than the outside shape of the reflector 4A1. As shown in FIG. 5, the plurality of blade portions 62 extend from the respective edges 612*e* of the plurality of projecting portions 612, and are arranged at equal intervals in the rotational direction 6R about the central axis 4Ac of rotation.

Since the plurality of projecting portions 612 are formed as described above, the plurality of blade portions 62 project to the outside in a radial direction about the central axis 4Ac of rotation. In other words, the plurality of blade portions 62 project from the side of the central axis 4Ac of rotation in a direction away from the central axis 4Ac of rotation. The rotation member 6 of the embodiment includes eight blade portions 62. The number of the blade portions 62 is not limited to eight. As shown in FIG. 6 (as viewed from the side of the motor 4A2), the rotation member 6 is driven by the motor 4A2 and thus rotates counterclockwise together with the reflector 4A1.

Here, the shape of the blade portion 62 will be described in detail.

As shown in FIG. 4, the blade portion 62 includes an inclined portion 62*a* that is inclined with respect to the reflector 4A1, and a bent portion 62*b* that is bent from the edge of the inclined portion 62*a*.

Figure 7:
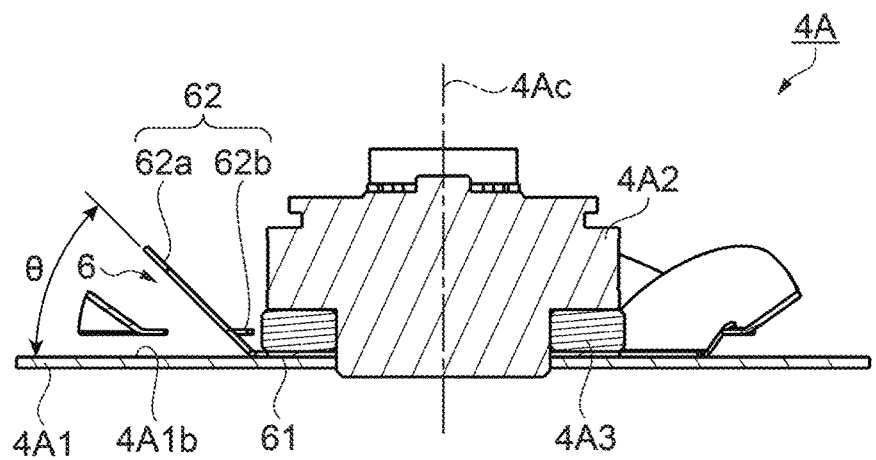
FIG. 7 is a cross-sectional view of the diffusing device of the embodiment.

FIG. 7 is a cross-sectional view of the diffusing device 4A.

As shown in FIG. 7, the inclined portion 62*a* is inclined so as to come closer to the reflector 4A1 from the outside to the inside in the radial direction about the central axis 4Ac of rotation. Specifically, examples of an inclination angle θ (see FIG. 7) of the inclined portion 62*a* with respect to the rear surface 4A1*b* (a plane orthogonal to the central axis 4Ac of rotation) can include, for example, a range of from 20° to 70°.

Moreover, as shown in FIG. 5, the inclined portion 62*a* includes, on the back side thereof in the rotational direction 6R, an inclined projecting portion 621, and the outer peripheral edge of the inclined portion 62*a* is formed in an arc shape in a plan view. The inclined projecting portion 621 projects in a direction opposite to the rotational direction 6R.

The bent portion 62*b* is bent from the edge of the inclined projecting portion 621 so as to face the reflector 4A1 (the rear surface 4A1*b*) (see FIG. 4). Specifically, the bent portion 62*b* is provided on the side of the blade portion 62 that is located on the back side of the blade portion 62, in the rotational direction 6R, provided with the bent portion 62*b*. Moreover, as shown in FIG. 5, the bent portion 62*b* is formed so as to be located in the extending direction of the edge 612*e*. That is, as shown in FIG. 7, the bent portion 62*b* is formed at a position close to the rear surface 4A1*b*, and is bent so as to be substantially parallel to the rear surface 4A1*b*. The bent portion 62*b* has the functions of smoothing a flow of air associated with the rotation of the rotation member 6 and reducing wind noise of the blade portion 62.

Figure 8:
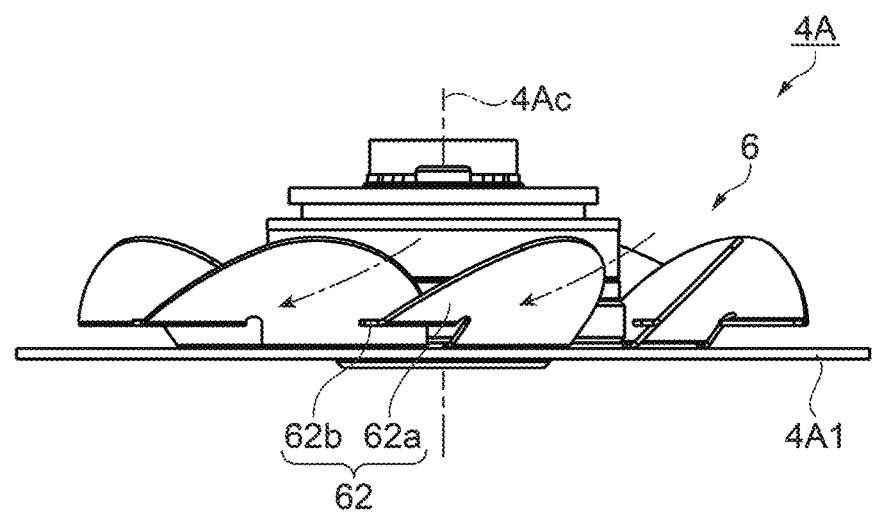
FIG. 8 is a side view of the diffusing device of the embodiment.

FIG. 8 is a side view of the diffusing device 4A.

In the diffusing device 4A, when the rotation member 6 is driven by the motor 4A2 and thus rotates, the blade portion 62 causes a flow of air, and the air flows between the inclined portion 62a and the reflector 4A1 as shown in FIG. 8. This air flows toward the reflector 4A1 because the inclined portion 62a is inclined as described above. Then, the reflector 4A1, which generates heat with incident light, is cooled by the flow of air. Moreover, since the heat of the reflector 4A1 is conducted to the plurality of blade portions 62 through the base portion 61, the reflector 4A1 is also cooled by the heat dissipation through the rotation member 6. That is, the rotation member 6 has an air directing function of directing the air to the reflector 4A1 and a heat dissipating function of dissipating the heat of the reflector 4A1.

Moreover, the inclination angle θ of the inclined portion 62a of the rotation member 6 is desirably set so as to direct a greater flow of air with the reflector 4A1 with low noise, that is, so as to further cool the reflector 4A1.

Figure 9:
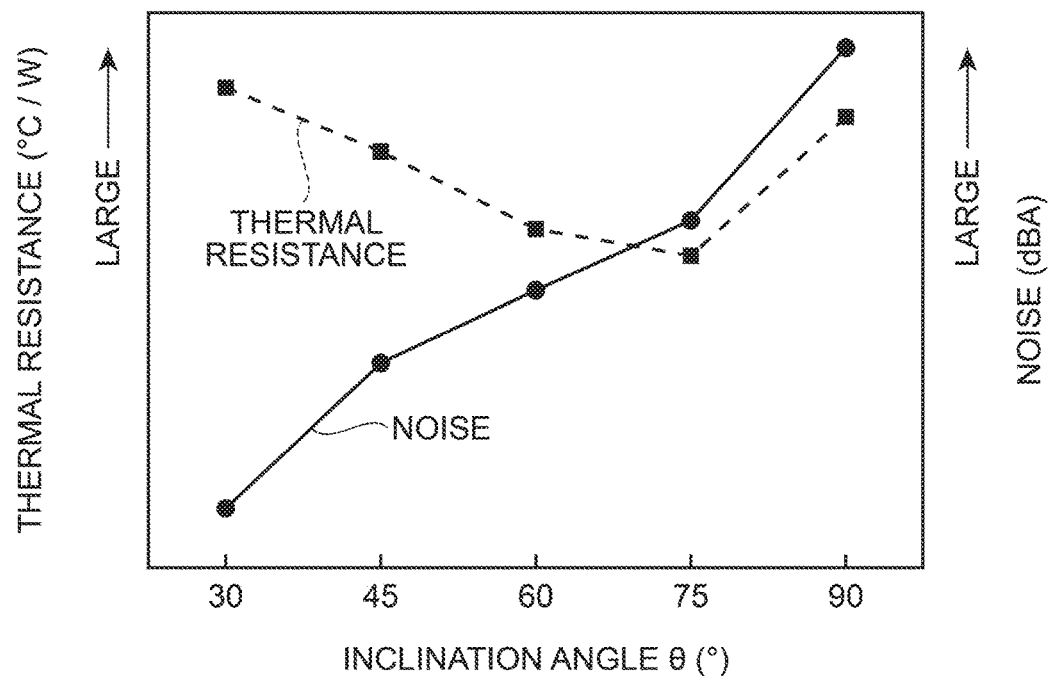
FIG. 9 is a graph showing simulation results of the relations between the inclination angle in the diffusing device of the embodiment and the thermal resistance and noise.

FIG. 9 is a graph showing simulation results of the relations between the inclination angle θ of the inclined portion 62a in the diffusing device 4A and the thermal resistance and noise. The thermal resistance corresponds to the cooling of the reflector 4A1, meaning that the smaller the value is, the further the reflector 4A1 is cooled. The thermal resistance is calculated based on a heat transfer coefficient that represents the heat transfer from the blade portion 62 to the air associated with a change in the inclination angle θ.

As shown in FIG. 9, the noise increases in the diffusing device 4A as the inclination angle θ of the inclined portion 62a becomes larger. This is thought to be because the amount of air moved by the inclined portion 62a associated with rotation increases as the inclination angle θ becomes larger.

On the other hand, as shown in FIG. 9, although the thermal resistance gradually decreases as the inclination angle θ becomes larger when the inclination angle θ is within a range of approximately 75° or less, the thermal resistance increases when the inclination angle θ exceeds approximately 75°. The reason for this is thought to be as follows. That is, much of the air impinging on the inclined portion 62a associated with rotation is directed to the reflector 4A1 when the inclination angle θ is approximately 75° or less; however, when the inclination angle θ exceeds approximately 75°, the air that is directed to the side different from the side of the reflector 4A1 increases and thus the air is not effectively directed to the reflector 4A1.

As described above, the reflector 4A1 is most efficiently cooled in the diffusing device 4A when the inclination angle θ is approximately 75°, but noise increases. Therefore, it is considered that the inclination angle θ is preferably set in a range of from 35° to 65°. When the diffusing device 4A that is not required to be of low noise is configured, the inclination angle θ is preferably set to approximately 75°.

According to the embodiment as has been described above, the following advantageous effects can be obtained.

(1) The rotation member 6 (heat dissipating portion) dissipates the heat of the reflector 4A1 generated by light incident thereon, from the plurality of blade portions 62 through the base portion 61. Moreover, the blade portion 62 includes the inclined portion 62a inclined with respect to the base portion 61. With this configuration, the rotation member 6 downsized in a direction vertical to the base portion 61 and having a large surface area can be made as compared with a configuration including an erected portion that is erected vertically to the base portion 61. Therefore, it is possible to provide the diffusing device 4A (optical device) in which the heat of the reflector 4A1 is efficiently dissipated while an increase in size is suppressed.

(2) Since the diffusing device 4A includes the rotation member 6 having the air directing function in addition to the heat dissipating function, the reflector 4A1 can be efficiently cooled. Hence, it is possible to provide the diffusing device 4A capable of suppressing the deterioration of the reflector 4A1 and thus extending a life span.

(3) Since the blade portion 62 includes the inclined projecting portion 621, a greater flow of air can be directed to the reflector 4A1. Therefore, the reflector 4A1 can be further efficiently cooled.

(4) Since the bent portion 62b is formed at the edge of the inclined projecting portion 621, the wind noise of the blade portion 62 can be reduced. Therefore, it is possible to efficiently cool the reflector 4A1 and rotate the rotation member 6 with suppressed noise.

(5) Since the rotation member 6 is formed of a sheet metal by press working, the manufacture thereof can be facilitated as compared with other manufacturing methods (metal molding, metal cutting work, etc.).

Moreover, since the plate thickness can be formed thin as compared with other manufacturing methods, the weight of the rotation member 6 can be reduced. Further, since the weight of the rotation member 6 can be reduced, the motor 4A2 of low power, that is, the motor 4A2 of small size or low power consumption, can be employed.

Since the light source device 4 includes the diffusing device 4A described above, the deterioration of the reflector 4A1 is suppressed and thus a life span can be extended.

(6) Since the projector 1 includes the light source device 4 described above, the projector 1 can maintain the optical performance of the reflector 4A1 and project an image having favorable image quality with high luminance over a long period of time.

Modified Examples

The embodiment may be modified as follows.

Figure 10:
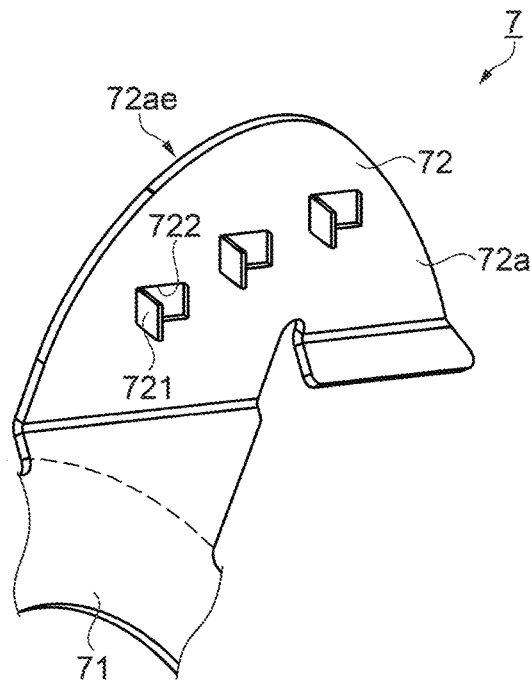
FIG. 10 is a partial perspective view of a rotation member of a modified example.

FIG. 10 is a partial perspective view of a rotation member 7 (heat dissipating portion) of a modified example, showing a portion of a base portion 71 and one blade portion 72.

As shown in FIG. 10, a plurality of convex portions 721 and a plurality of openings 722 that are provided corresponding to the plurality of convex portions 721 are formed in an inclined portion 72a in the blade portion 72. The convex portion 721 and the opening 722 are formed by cutting and raising a portion of the inclined portion 72a by press working. Since a surface area is increased by providing the convex portion 721 and the opening 722 in the blade portion 72 as described above, the heat dissipating function of the rotation member/can be enhanced. A shape not including the convex portion 721 but including the opening 722 may also be employed.

Moreover, although not shown in the drawing, a concavo-convex shape may be provided at an outer peripheral edge 72ae of the inclined portion 72a shown in FIG. 10. With this configuration, since the surface area of the rotation member 7 can be formed large, the heat dissipating function of the rotation member 7 can be enhanced.

Figure 11:
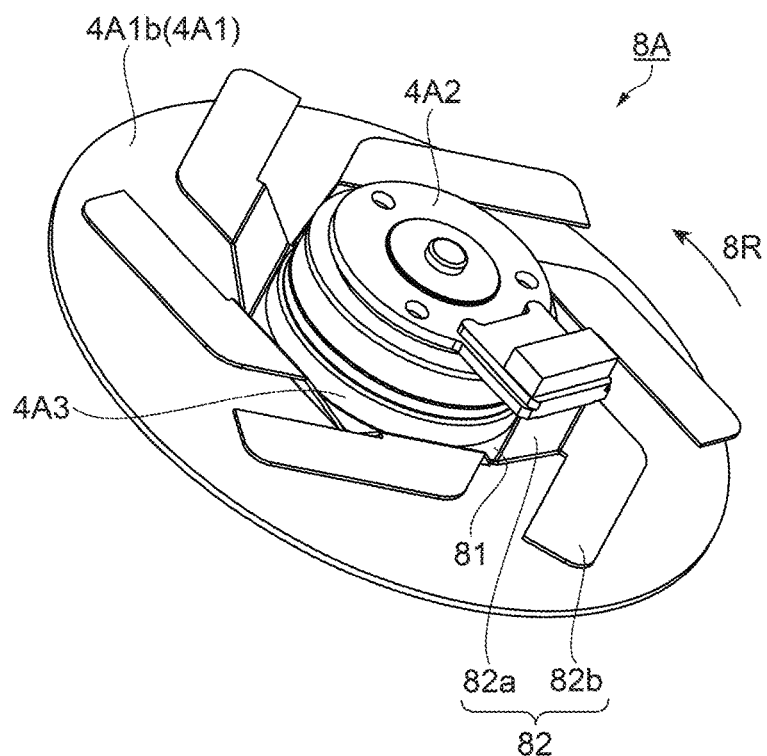
FIG. 11 is a perspective view of a diffusing device of a modified example.
Figure 12:
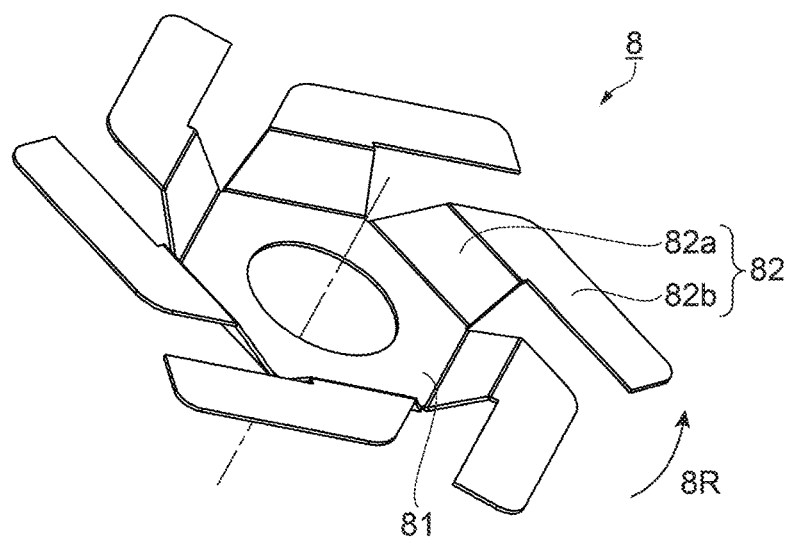
FIG. 12 is a perspective view of a rotation member of the modified example.

FIGS. 11 and 12 are diagrams for explaining a rotation member 8 (heat dissipating portion) of a modified example, in which FIG. 11 is a perspective view of a diffusing device 8A (optical device) including the rotation member 8, and FIG. 12 is a perspective view of the rotation member 8.

As shown in FIG. 11, the diffusing device 8A includes, similarly to the diffusing device 4A of the embodiment, the reflector 4A1, the motor 4A2, and the spacer 4A3, in addition to the rotation member 8.

As shown in FIG. 12, the rotation member 8 includes a base portion 81 and a plurality of blade portions 82 that project from the base portion 81. As shown in FIG. 11, the base portion 81 is stacked on the reflector 4A1. The blade portion 82 includes an inclined portion 82a that is inclined with respect to the reflector 4A1, and a bent portion 82b that is bent from the edge of the inclined portion 82a.

The bent portion 82b is bent so as to face the reflector 4A1 (the rear surface 4A1b) and so as to be substantially parallel to the reflector 4A1. Moreover, the back side of the bent portion 82b in a rotational direction 8R projects from the inclined portion 82a.

According to this configuration, although the amount of air directed to the reflector 4A1 is reduced as compared with the rotation member 6 of the embodiment, the air directed to the side opposite to the reflector 4A1 can be blocked by the bent portion 82b and directed to the reflector 4A1 even if the inclination angle of the inclined portion 82a is increased. Therefore, it is possible to provide the diffusing device 8A capable of efficiently cooling the reflector 4A1 while achieving low noise. Since the bent portion 82b is disposed parallel to a surface 4A1b, a resistance due to contact with the air is reduced and a load to the motor rotating can also be reduced, thereby leading to an improvement in durability.

In the embodiment, a configuration in which the rotation member 6 is stacked on the reflector 4A1 as an optical element has been shown. However, an optical device in which the wavelength conversion element 471 (see FIG. 2) is used as an optical element and which includes the wavelength conversion element 471 and a rotation member (heat dissipating portion) stacked on the wavelength conversion element 471 may be configured.

The optical device (the diffusing device 4A or 8A) described above is configured to include the rotation device (the motor 4A2) and rotate the heat dissipating portion (the rotation member 6, 7, or 8). However, an optical device not including the rotation device but including a non-rotatable optical element and a heat dissipating portion that dissipates the heat of the optical element may be configured. Then, the heat dissipating portion may be configured to include a base portion placed on the optical element and a plurality of blade portions including inclined portions. For example, although not shown in the drawing, an optical device in which a wavelength conversion element configured to be non-rotatable is used an optical element and which includes the optical element and a heat dissipating portion that dissipates the heat of the optical element may be configured.

Moreover, a projector including this optical device preferably includes a cooling device that sends the air to the optical device.

The rotation member 6 of the embodiment is made of a sheet metal and formed by press working, but may be formed by other manufacturing methods (a manufacturing method in which the rotation member is molded from molten metal, cutting out from a mass of metal, etc.). In the case of other manufacturing methods, it is possible to employ a shape not provided with an opening corresponding to the opening 722 in the rotation member 7 (see FIG. 10) of the modified example.

Although the projector 1 of the embodiment uses a transmissive liquid crystal panel as the light modulator 34, the projector may use a reflective liquid crystal panel.

Moreover, a micromirror-type light modulator, for example, a digital micromirror device (DMD) or the like may be used as a light modulator.

Although a so-called three-plate type using the three light modulators 34R, 34G, and 34B is employed for the light modulators 34 of the embodiment, the light modulator is not limited to this type. The invention may employ a single-plate type, or the invention can be applied to a projector including two, or four or more, light modulators.

What is claimed is:

1. An optical device comprising:
   an optical element; and
   a heat dissipating portion configured to dissipate heat of the optical element by rotating together with the optical element,
   wherein the heat dissipating portion includes
      a base portion placed on the optical element, and
      a plurality of blade portions that project from the base portion to the side opposite to the optical element, and
   wherein the plurality of blade portions each include an inclined portion that is inclined with respect to the base portion.

2. The optical device according to claim 1, wherein the heat dissipating portion is integrally formed of a sheet metal.

3. The optical device according to claim 1, wherein an opening is formed in each blade portion included in the plurality of blade portions.

4. The optical device according to claim 1, wherein each blade portion included in the plurality of blade portions is provided with a convex portion.

5. A light source device comprising:
   a light source;
   the optical device according to claim 1, on which light emitted from the light source is incident; and
   a rotation device that rotates the optical device, wherein
   the heat dissipating portion is a rotation member that rotates together with the optical element,
   the base portion surrounds a central axis of rotation of the rotation member,
   the plurality of blade portions project from the base portion to the outside in a radial direction about the central axis of rotation, and
   the inclined portion is inclined with respect to the optical element so as to come closer to the side of the optical element from the outside to the inside in the radial direction about the central axis of rotation.

6. A light source device comprising:
   a light source;
   the optical device according to claim 2, on which light emitted from the light source is incident; and
   a rotation device that rotates the optical device, wherein
   the heat dissipating portion is a rotation member that rotates together with the optical element,
   the base portion surrounds a central axis of rotation of the rotation member,
   the plurality of blade portions project from the base portion to the outside in a radial direction about the central axis of rotation, and
   the inclined portion is inclined with respect to the optical element so as to come closer to the side of the optical element from the outside to the inside in the radial direction about the central axis of rotation.

7. A light source device comprising:
   a light source;

the optical device according to claim 3, on which light emitted from the light source is incident; and a rotation device that rotates the optical device, wherein the heat dissipating portion is a rotation member that rotates together with the optical element, the base portion surrounds a central axis of rotation of the rotation member, the plurality of blade portions project from the base portion to the outside in a radial direction about the central axis of rotation, and the inclined portion is inclined with respect to the optical element so as to come closer to the side of the optical element from the outside to the inside in the radial direction about the central axis of rotation.

8. A light source device comprising:

a light source;

the optical device according to claim 4, on which light emitted from the light source is incident; and a rotation device that rotates the optical device, wherein the heat dissipating portion is a rotation member that rotates together with the optical element, the base portion surrounds a central axis of rotation of the rotation member, the plurality of blade portions project from the base portion to the outside in a radial direction about the central axis of rotation, and the inclined portion is inclined with respect to the optical element so as to come closer to the side of the optical element from the outside to the inside in the radial direction about the central axis of rotation.

9. The light source device according to claim 5, wherein the inclined portion includes, on the back side thereof in a rotational direction of the rotation member, an inclined projecting portion that projects in a direction opposite to the rotational direction.

10. The light source device according to claim 9, wherein each blade portion included in the plurality of blade portions includes a bent portion that is bent from an edge of the inclined projecting portion so as to face the optical element.

11. A projector comprising:

the light source device according to claim 5;

a light modulator that modulates light emitted from the light source device; and a projection optical device that projects the light modulated by the light modulator.

12. A projector comprising:

the light source device according to claim 6;

a light modulator that modulates light emitted from the light source device; and a projection optical device that projects the light modulated by the light modulator.

13. A projector comprising:

the light source device according to claim 7;

a light modulator that modulates light emitted from the light source device; and a projection optical device that projects the light modulated by the light modulator.

14. A projector comprising:

the light source device according to claim 8;

a light modulator that modulates light emitted from the light source device; and a projection optical device that projects the light modulated by the light modulator.

15. A projector comprising:

the light source device according to claim 9;

a light modulator that modulates light emitted from the light source device; and a projection optical device that projects the light modulated by the light modulator.

16. A projector comprising:

the light source device according to claim 10;

a light modulator that modulates light emitted from the light source device; and a projection optical device that projects the light modulated by the light modulator.

* * * * *